(12) United States Patent
Lord

(10) Patent No.: US 7,583,641 B2
(45) Date of Patent: Sep. 1, 2009

(54) METHODS AND APPARATUS FOR NETWORK JOINING USING A MULTIPLE MESSAGE PER TDMA CONTROL SLOT METHODOLOGY

(75) Inventor: Bruce J. Lord, Redmond, WA (US)

(73) Assignee: The Boeing Company, Chicago, IL (US)

( * ) Notice: Subject to any disclaimer, the term of this patent is extended or adjusted under 35 U.S.C. 154(b) by 591 days.

(21) Appl. No.: 11/419,926

(22) Filed: May 23, 2006

(65) Prior Publication Data

US 2007/0274346 A1 Nov. 29, 2007

(51) Int. Cl.
*H04J 3/00* (2006.01)
*H04B 7/212* (2006.01)

(52) U.S. Cl. ...................... 370/337; 370/442

(58) Field of Classification Search ................ 370/314, 370/321, 326, 330, 336, 337, 347, 431, 436, 370/442, 443, 230.1, 468; 342/25 D, 25 E, 342/140; 33/20.2, 290, 293
See application file for complete search history.

(56) References Cited

U.S. PATENT DOCUMENTS

| | | | | |
|---|---|---|---|---|
| 4,646,100 | A * | 2/1987 | England | 343/757 |
| 5,541,929 | A | 7/1996 | Jokura | |
| 5,640,395 | A | 6/1997 | Hamalainen | |
| 5,696,765 | A * | 12/1997 | Safadi | 370/436 |
| 5,732,073 | A * | 3/1998 | Kusaki et al. | 370/280 |
| 6,067,407 | A * | 5/2000 | Wadsworth et al. | 709/224 |
| 6,201,801 | B1 * | 3/2001 | Dent | 370/342 |
| 6,388,997 | B1 * | 5/2002 | Scott | 370/280 |
| 6,628,707 | B2 | 9/2003 | Rafie et al. | |
| 6,788,665 | B1 | 9/2004 | Vancraeynest | |
| 6,798,761 | B2 | 9/2004 | Cain et al. | |
| 6,804,208 | B2 | 10/2004 | Cain et al. | |
| 6,816,115 | B1 * | 11/2004 | Redi et al. | 342/367 |
| 6,836,242 | B1 | 12/2004 | Batzer et al. | |
| 6,859,444 | B1 | 2/2005 | Vancraeynest | |
| 6,901,064 | B2 | 5/2005 | Cain et al. | |

(Continued)

FOREIGN PATENT DOCUMENTS

EP 1657852 A1 5/2006

(Continued)

OTHER PUBLICATIONS

Dan DiNicolo, Understanding Network Models—The OSI Model, Jan. 22, 2004, iEntry, Inc., p. 2.*

(Continued)

*Primary Examiner*—Chirag G Shah
*Assistant Examiner*—Ashley L Shivers
(74) *Attorney, Agent, or Firm*—Armstrong Teasdale LLP

(57) ABSTRACT

A method for transmitting network joining message packets during control slots of a time division multiple access (TDMA) frame sequence is described. The method includes determining a size of the network joining packet to be processed for transmission, recognizing which slots of the TDMA frame sequence are control slots, subdividing the control slots based on at least one of the size of the network joining packet and a data rate of a control slot queue, and transmitting a number of the network joining message packets during the control slot of the TDMA frame sequence, the number of transmitted based on the subdivision of the control slots.

31 Claims, 5 Drawing Sheets

U.S. PATENT DOCUMENTS

| | | | |
|---|---|---|---|
| 6,904,032 B2 | 6/2005 | Cain | |
| 6,947,733 B2 | 9/2005 | Tillotson | |
| 6,954,449 B2 | 10/2005 | Cain et al. | |
| 6,958,986 B2 | 10/2005 | Cain | |
| 6,982,987 B2 | 1/2006 | Cain | |
| 7,027,109 B2 | 4/2006 | Cain | |
| 7,031,288 B2 | 4/2006 | Ogier | |
| 2004/0137859 A1* | 7/2004 | Muto | 455/126 |
| 2006/0104232 A1* | 5/2006 | Gidwani | 370/328 |
| 2007/0167752 A1* | 7/2007 | Proulx et al. | 600/437 |

FOREIGN PATENT DOCUMENTS

| | | | |
|---|---|---|---|
| WO | WO 02063806 A2 * | 8/2002 | |

OTHER PUBLICATIONS

International Search Report of PCT/US2007/012390; Nov. 13, 2007; 14 pages.

Gustavsson, N.; VDL Mode 4/ STDMA-a CNS Data Link; IEEE 1996; pp. 111-116; Digital Avionics Systems Conference; Atlanta, GA, Oct. 27-31, 1996; vol. CONF.15; New York.

Grönkvist, J.; Assignment Methods for Spatial Reuse TDMA; IEEE 2000; pp. 119-124; Mobile and Ad Hoc Networking and Computing 2000 Annual Workshop; Piscataway, NJ, Aug. 11, 2000.

Nelson, R.; Spatial TDMA: A Collision-Free Multihop Channel Access Protocol; IEEE 1985; pp. 934-944; IEEE Transactions on Communications; vol. COM-33, No. 9.

Björklund, P., et al.; A Column. Generation Method for Spatial TDMA Scheduling in Ad Hoc Networks; Ad Hoc Networks; Oct. 2004; pp. 405-418; vol. 2, No. 4.

* cited by examiner

METHODS AND APPARATUS FOR NETWORK JOINING USING A MULTIPLE MESSAGE PER TDMA CONTROL SLOT METHODOLOGY

BACKGROUND OF THE INVENTION

This invention relates generally to communications between nodes in a network, and more specifically, to methods and apparatus for network joining using a multiple message per time division multiple access (TDMA) slot methodology.

Constructing a mobile ad hoc network (MANet) that includes multiple nodes automatically, in the field, without manual configuration, requires each new network node or terminal to both announce itself to the other nodes in the network, and sense the other network nodes that use the same radio frequency (RF) waveform. Network nodes are sometimes referred to as network devices, and such a process is sometime referred to as network joining.

In one network implementation, sometimes referred to as a network layer 1 and layer 2 implementation, a spatial time division multiple access (STDMA) technique is utilized for joining. This joining implementation minimizes mutual interference with other mobile terminals of the same type, enhances scalability of the network, and reduces the probability of interception. In such a network implementation, linking, or joining communication between two terminals is pre-coordinated and scheduled in specified TDMA time slots. Since a single frequency and bandwidth are used, joining communications are half-duplex. One terminal, or node, is scheduled to transmit while the other terminal, or node, is scheduled to receive for a given time slot.

Spatial separation is accomplished by these typically wireless terminals through employment of phased array antennas (PAA) that have high gain and narrow beams that specifically point at each other. These antennas operate based on line-of-sight (LOS) and point-to-point operation to close the wireless link communication within that scheduled time slot. Outside of the LOS beam link, reception is impaired due to the transmitter power being set to just achieve link closure within a set margin. Link closure for communication is only accomplished by having the same RF waveform, a pre-negotiated slot and transmit/receive assignment, a known position to the terminal in which another terminal is trying to communicate, and a known range between the two terminals. Given that a mobile terminal is trying to discover another mobile terminal without a priori knowledge of the above consideration, a methodology is needed so that these two mobile terminals (network devices) can quickly discover one another within a network.

BRIEF DESCRIPTION OF THE INVENTION

In one aspect, a method for transmitting network joining message packets during control slots of a time division multiple access (TDMA) frame sequence is provided. The method includes determining a size of the network joining packet to be processed for transmission, recognizing which slots of the TDMA frame sequence are control slots, and subdividing the control slots based on at least one of the size of the network joining packet and a data rate of a control slot queue. The method also includes transmitting a number of the network joining message packets during the control slot of the TDMA frame sequence, the number of transmitted based on the subdivision of the control slots.

In another aspect, a network device is provided that comprises a processor programmed with a message routing protocol, a link layer, and a media access (MAC) layer, a transmitter configured to receive network joining message packets from the processor, and an antenna. The antenna is operable to transmit at least network joining message packets received from the transmitter. The network device is programmed to transmit multiple network joining message packets during a control slot of a time division multiple access (TDMA) frame sequence.

In still another aspect, a method for using the duration a control slot of a time division multiple access (TDMA) frame sequence to transmit multiple network joining message packets is provided. The method comprises determining a size of the network joining message packet to be transmitted, and calculating the number of network joining message packets that can be transmitted during a control slot based on the size of the network joining message packet and a transmission data rate associated with the TDMA frame sequence.

DETAILED DESCRIPTION OF THE INVENTION

Multiple terminals that are trying to discover one another, or join a network, may utilize IEEE 802.11 methodology for ad-hoc network joining. More specifically, each unsynchronized receiver may be configured to listen for another terminal transmitting like waveforms. For a single receiver, if a transmitter transmitting such a carrier waveform is not sensed by the receiver, then the listening receiver enables its transmitter to transmit its own hello (network joining packet) message.

Such a methodology works well for omni-directional antennas that do not need to know where like terminals exist. If a like terminal is within range, then it will receive the network joining message and be able to respond accordingly. Terminals using phased array antennas can mimic omni-directional antennas if they can expand their narrow beams to cover a field of regard for the antenna. Grouping several antennas together such that the field of regard for the cluster of antennas associated with a phased array antenna on a terminal covers a hemisphere with minimal overlap, thereby allows emulation of an omni-directional antenna.

A typical time division, multiple access (TDMA) slot is allocated to a singe transmit and receive communicating pair (also referred to as a single link) of wireless terminals. If the allocated time of a TDMA slot is not completely filled with data, the unused time is essentially wasted, thereby reducing an efficiency in the utilization of the link between the communicating pair. If a particular TDMA slot is configured as a control slot, as further described below, it is typically allocated with only a single network joining (hello) packet. The operation associated with TDMA slots configured as control slots is referred to herein as network joining.

Figure 1:
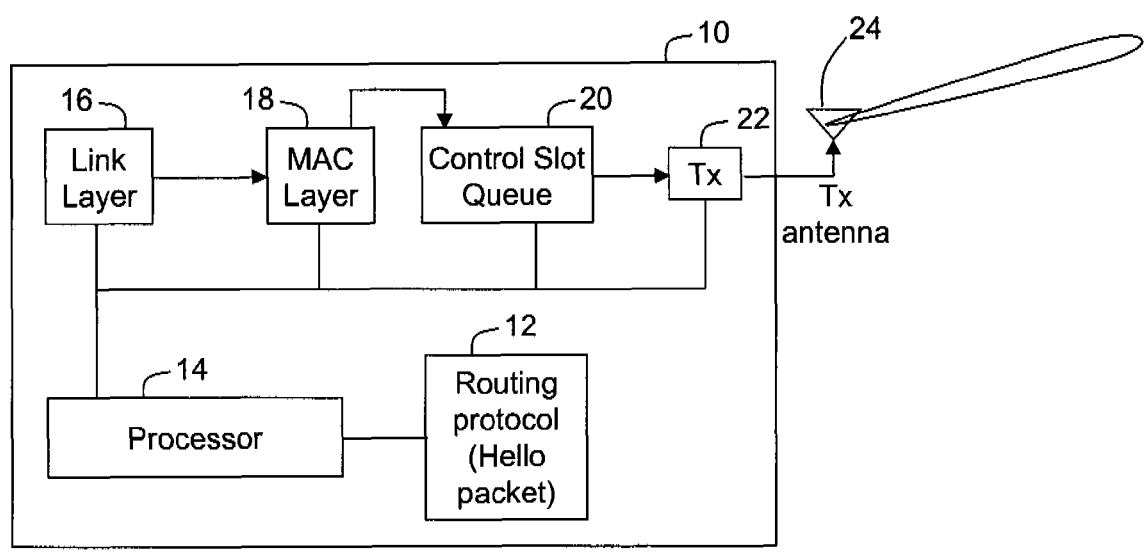
FIG. 1 is a block diagram of a mobile terminal configured to transmit multiple network joining messages within a single control slot of a time division, multiple access (TDMA) frame sequence.

In one embodiment described herein, network joining is initiated by a standard routing protocol. An example of a standard routing protocol is version two of open shortest path first (OSPFv2). Referring to FIG. 1, when a mobile terminal 10, sometimes referred to herein as a network device, is turned on, a routing protocol 12 utilized by a processor 14 within mobile terminal 10 will attempt to announce the presence of mobile terminal 10 by causing processor 14 to initiate the sending of a network joining packet to a network of similar mobile terminals. A terminal link layer 16 checks a header of all outgoing message packets generated by processor 14. If a message packet is identified as a network joining packet by terminal link layer 16 then a joining process is initiated. Though a network joining packet is further routed through a media access control (MAC) layer 18, and may be placed in a transmission control slot queue 20, no customization of the network joining packet is performed after the packet passes through link layer 16. However, information related to transmission of the network joining packet is appended to the packet. The network joining packet is eventually passed through a transceiver 22 for output by antenna 24 as further described below.

In one embodiment, further described below with respect to FIG. 6, transmit control slot queue 20 is sub-divided to allow for multiple network joining packets to be sent along multiple azimuth and elevation lines of sight (shown in FIG. 3) to fill the unused portion of the TDMA control slot. Depending on the size of the network joining packet, the data rate of the control slot queue 20 and transceiver 22, and the fraction of control slots to data slots, the improved bandwidth utilization and efficiency of a network joining can be substantial.

Figure 2:
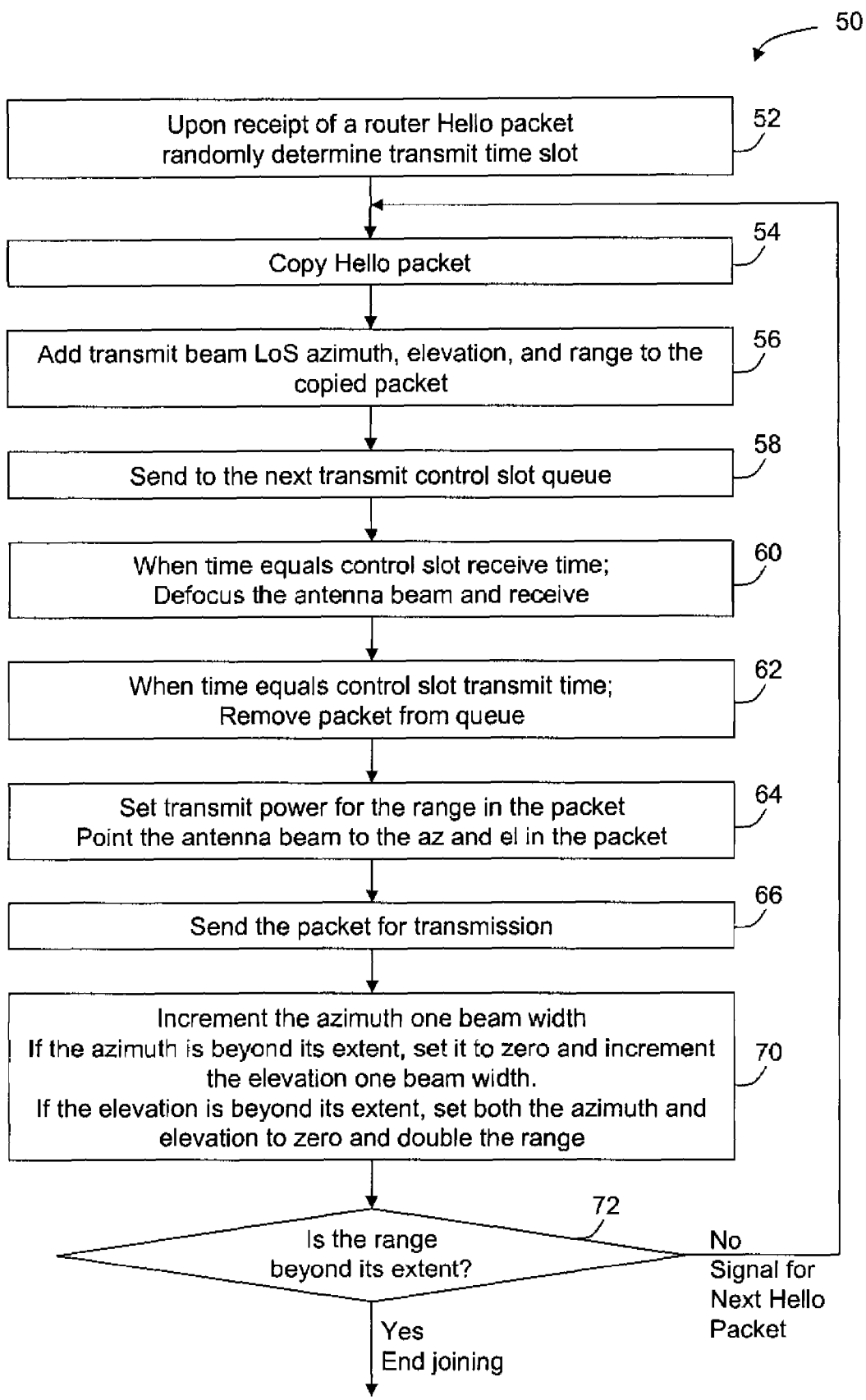
FIG. 2 is a flowchart illustrating a networking joining method performed by the mobile terminal of FIG. 1.

FIG. 2 is a flowchart 50 further illustrating the network joining process performed by mobile terminal 10. When mobile terminal 10 is powered up, routing protocol 12 through processor 14 sends its network joining packet which is received by link layer 16. All similarly configured mobile terminals use the same routing protocol, which, in one embodiment, is timer synchronized by GPS. Link layer 16 interrogates the header of this packet before it is sent to the physical layer (MAC layer 18) for transmission. If the packet header is identified as a network joining packet then link layer 16 commences the joining procedure.

Terminal joining is only performed in the two control slots of each TDMA frame sequence. When link layer 16 identifies the packet header as a network joining packet, it randomly determines 52, by assigning a value of 0 or 1, if mobile terminal 10 transmits the network joining packet in the first or second control slot of an upcoming TDMA frame sequence. In one embodiment, if the value is 0, then the mobile terminal 10 transmits the network joining packet in the first control slot and receives in the second slot. If the value is 1, then the mobile terminal 10 receives in the first slot of the TDMA frame sequence and transmits the network joining packet in the second slot. The network joining packet is then copied 54 to MAC layer 18.

The joining process is performed throughout the phased array antenna's combined field of regard, searching for like terminals and is controlled by link layer 16. In conjunction with the network joining packet, MAC layer 18 attaches 56 control information to the network joining packet that contains, for example, line of sight azimuth and elevation information indicating where to point the narrow transmit beam of the phased array antenna and a range (as further illustrated in FIG. 3, described below), which is utilized by transceiver 22 to determine a transmit power. The network joining packet is then sent 58 for placement into the next transmit slot control queue.

During a receive control slot of the TDMA frame sequence, the phased array antenna of mobile terminal 10 is defocused 60 to operate as an omni-directional receiver. During a transmit control slot of the TDMA frame sequence, the network joining packet is removed 62 from the control queue, transmitter 22 is configured 64 with power defined by the range information and the phased array antenna beam controlled to the line of sight azimuth and elevation information that were appended to the network joining packet, and the network joining packet is sent 66 for transmission through transceiver 22 and antenna array 24.

For subsequent transmissions of the network joining packet, at least one of the azimuth and the elevation are incremented 70 as is the range, or power, of the transmissions. Once the transmission range is beyond 72 a limit, the joining process ends. If the range has not yet been extended beyond the limit, a signal signifying that the next network joining packet is to be sent is provided.

In a specific embodiment, and with regard to incrementing azimuth, elevation, and range, link layer 16 begins the joining process utilizing a lowest possible azimuth and elevation of the phased array antenna's combined field of regard. The first transmit beam's line of sight is calculated as being one-half the 3 dB beam width in azimuth and elevation up from the lowest point. A minimum range for joining is defined and combined with the calculated azimuth and elevation and then reported in the packet control information. MAC Layer 18 of mobile terminal 10 receives the packet with the attached control information and places it into the first upcoming transmit control slot available.

Figure 3:
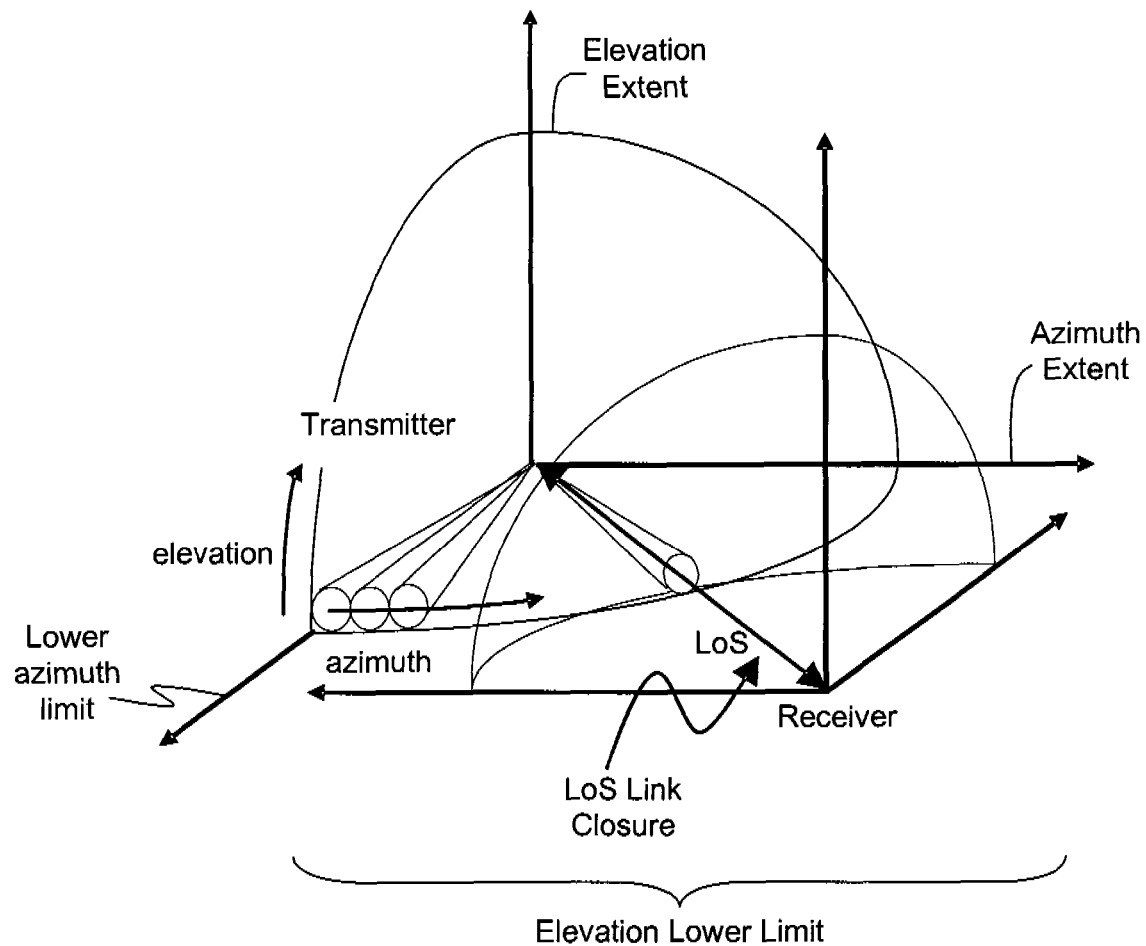
FIG. 3 is an illustration of a network joining transmission pattern transmitted by the mobile terminal of FIG. 1.

After MAC layer 18 causes the first network joining packet to be transmitted, it sends an interrupt to link layer 16 telling it to send the next network joining packet to MAC Layer 18. Link layer 16 copies the first network joining packet and increments the line of sight azimuth used when transmitting the first network joining packet a single 3 dB beam width. The incrementing in azimuth, along with elevation and range, is illustrated in FIG. 3. The incremented azimuth, along with the original values for elevation and transmit range are added to the control information for the next network joining packet and forwarded to MAC layer 18 for transmission in the next available TDMA frame sequence control slot. This sequence is repeated until the azimuth extent of the field of regard for the phased array antenna is reached.

Once the azimuth extent is reached, the elevation is incremented by one 3 dB beam width, and the azimuth is reset to one-half the 3 dB beam width up from the phase array antenna's combined field of regard lower azimuth limit. Then the above described azimuth incrementing process is repeated. Once the phased array antenna transmission beam reaches the upper limit in both field of regard for azimuth and for elevation, then the transmission range is doubled. The packet transmission process is repeated for the same phase array antenna narrow beam line of sight azimuth and elevation points, covering the phase array antenna's entire field of regard. The range is then doubled again and the process of resetting and incrementing azimuth and elevation is repeated until the upper transmission range has been reached for all line of sight azimuth and elevation settings.

Minimizing mutual interference with other mobile terminals with the same waveform implies that, for transmission, it is not desirable to emulate an omni-directional antenna, specifically, for transmitting a network joining packet. Rather, to transmit a network joining packet, as illustrated in FIG. 3, the narrow beam of the phased array antenna is utilized, which also provides the added benefit of requiring less power to transmit a signal over the same range.

For the final transmitted beam, link layer 16 forwards the original network joining packet along with the control information to MAC Layer 18. While this joining process is being executed no other packets will be queued in the transmission control slot by MAC Layer 18. This limitation ensures that all like terminals are performing in synchronization. The time it takes to execute the above described process is sometimes referred to as the network joining time.

Figure 4:
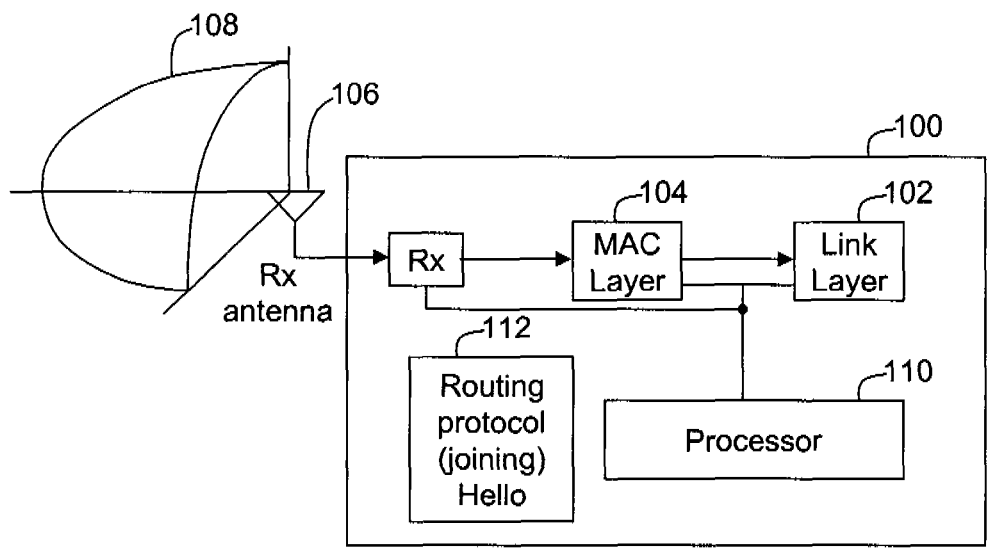
FIG. 4 is a block diagram of a mobile terminal configured to receive transmissions from the mobile terminal of FIG. 1.

While mobile terminal 10 is transmitting in its control slot, another mobile terminal 100, shown in FIG. 4, is receiving in the same control slot. During its receive slot, a link layer 102 and MAC layer 104 of mobile terminal 100 are controlling phased array antenna 106 such that its beam 108 covers the entire field of regard of phased array antenna 106. In the embodiment, beam 108 is an omni-antenna beam pattern for that field of regard coverage. When a link is closed by mobile terminal 100 recognizing a network joining packet received from, for example, mobile terminal 10, the packet is routed through processor 110 from link layer 102 where the network joining packet is routed through a stored routing protocol 112 for handling by processor 110.

In one embodiment, mobile terminal 100 is configured to utilize its receive phase array antenna beams without mutual interference, allowing mobile terminal 100 to "listen" over an entire hemisphere. Thus the time it takes for mobile terminal 10 to discover other like terminals is determined by the time it takes to transmit network joining packets using the narrow beam over the azimuth and elevation angle extents of the phase array antenna's field of regard and up to the maximum range of the transmitter of mobile terminal 10. Efficient implementation of the network joining, or discovery, method described herein is performed, in one embodiment, by synchronizing all like terminals in the potential network. A TDMA MAC layer is one convenient implementation to achieve that synchronization.

Figure 5:
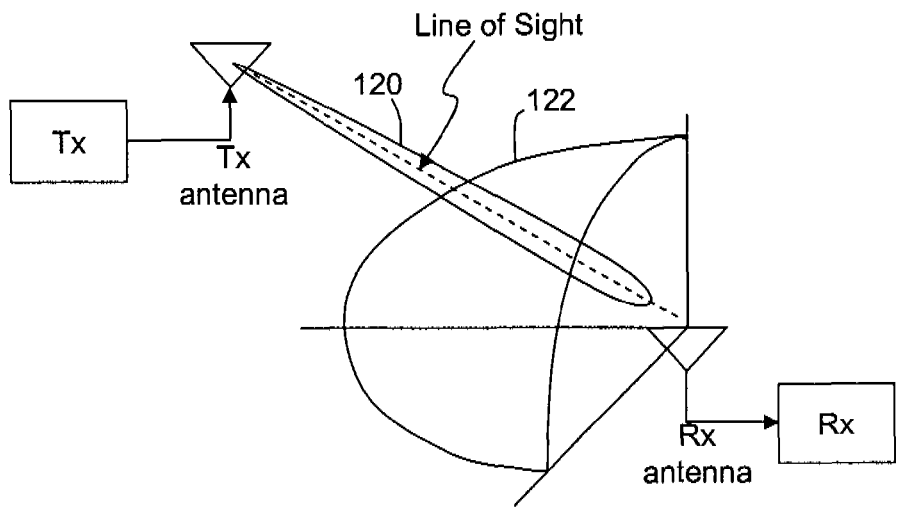
FIG. 5 is an illustration of the narrow beam transmission of the mobile terminal of FIG. 1 linking with an omni-directional receiving pattern of the mobile terminal of FIG. 4.

FIG. 5 is an illustration of mobile terminal transmit and receiver antenna beam geometry. Once the transmitting mobile terminals phased array antenna transmit beam 120 is commanded to point to a line of sight and within a range where a like terminal is receiving (e.g., within omni-antenna beam pattern 122), the link between the two mobile terminals, for example, mobile terminals 10 and 100 (shown in FIGS. 1 and 4 respectively) will close and receiving terminal 100 will intercept the network joining packet from transmitting mobile terminal 10. The network joining packet is sent up through the receiving terminal's processor 110 for handling using routing protocol 112 for proper handling including the sending of a response packet back to mobile terminal 10. All router messages that are not network joining messages are queued into data slots within MAC Layer 104.

Figure 6:
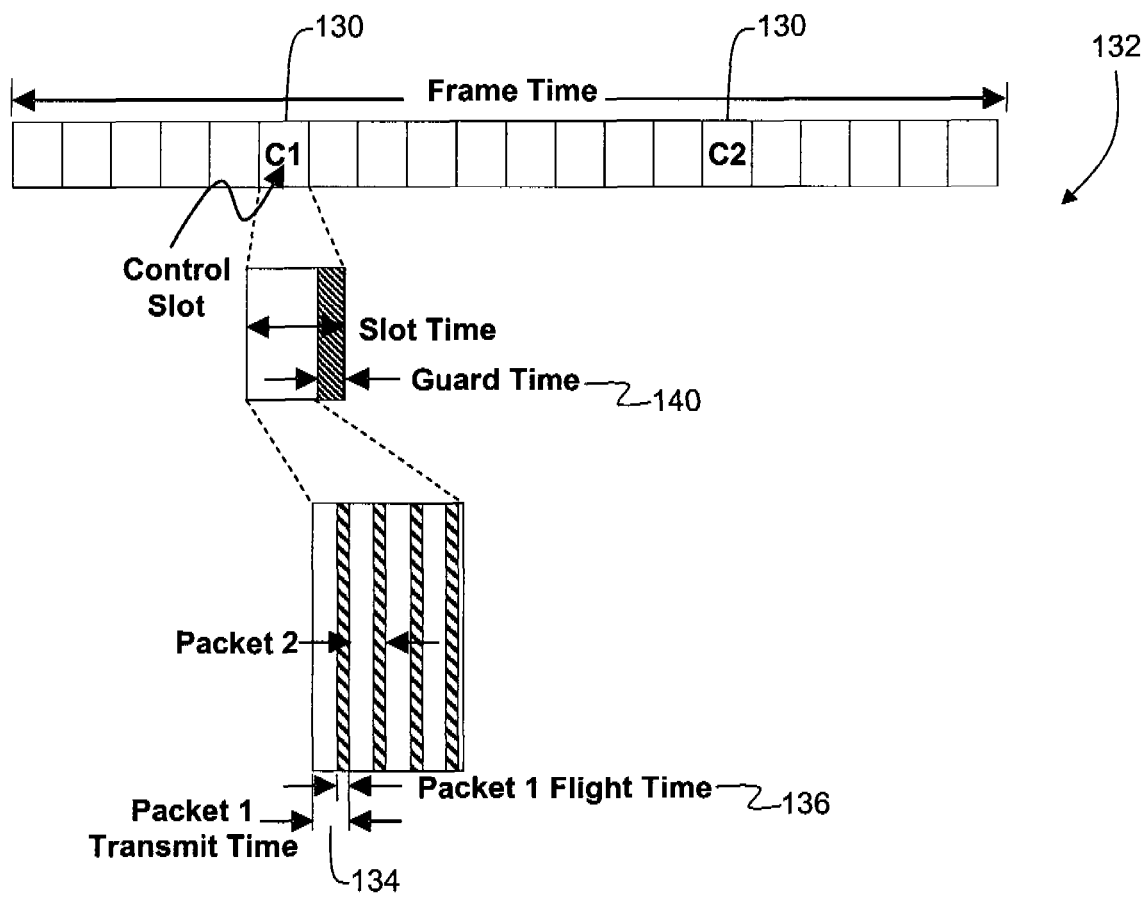
FIG. 6 illustrates multiple network joining packets for transmission within a single control slot of a TDMA frame sequence.

Now referring to FIG. 6, the joining process described above is only performed during control slots 130 of a TDMA frame sequence 132. This joining process expands the typical TDMA implementation that associates a single slot to a single link between two wireless terminals. With the above described methods, a single TDMA control slot 130 is divided into as many links as there are packets' destinations stacked into its queue.

Recall that link layer 16 of mobile terminal 10 sends the first network joining packet to MAC layer 18 to be queued into a transmit control slot 130 of mobile terminal 10. Upon packet arrival, MAC Layer 18 calculates the packet transmit time 134 as being the size of the network joining packet divided by the transmission data rate plus a packet flight time 136 as being the transmit range divided by the speed of light. When the time within control slot 130 reaches its queue time, MAC layer 18 extracts the network joining packet from the queue, attaches state information of the mobile terminal to the network joining packet, reads the attached control information for that packet, and commands the phased array antenna beam to point to the reported line of sight azimuth and elevation. Mac layer 18 also calculates the transmitter power from the attached control information range, commands transmitter 22 to transmit the packet at that power level, and sends the network joining packet to transmitter 22 for transmission. When the last bit leaves transmitter 22, MAC layer 18 sends an interrupt to link layer 16 to send down the next copy of the network joining packet. The transmit beam from antenna 24 dwells at the control line of sight azimuth and elevation for the calculated transmit period of time. Once that period of time has passed, MAC layer 18 then extracts the next network joining packet from the queue and repeats the process, for example, incrementing the line of sight azimuth and transmitting the network joining packet.

Referring again to FIG. 6, MAC layer 18 will continue to place network joining packets sent into the queue of control slot 130 as long as enough transmit time remains before the control slot time reaches a guard time 140. Once time has elapsed into guard time 140, MAC layer 18 places the next arriving network joining packet into the same control slot 130 for transmission during the next frame time 132.

Figure 7:
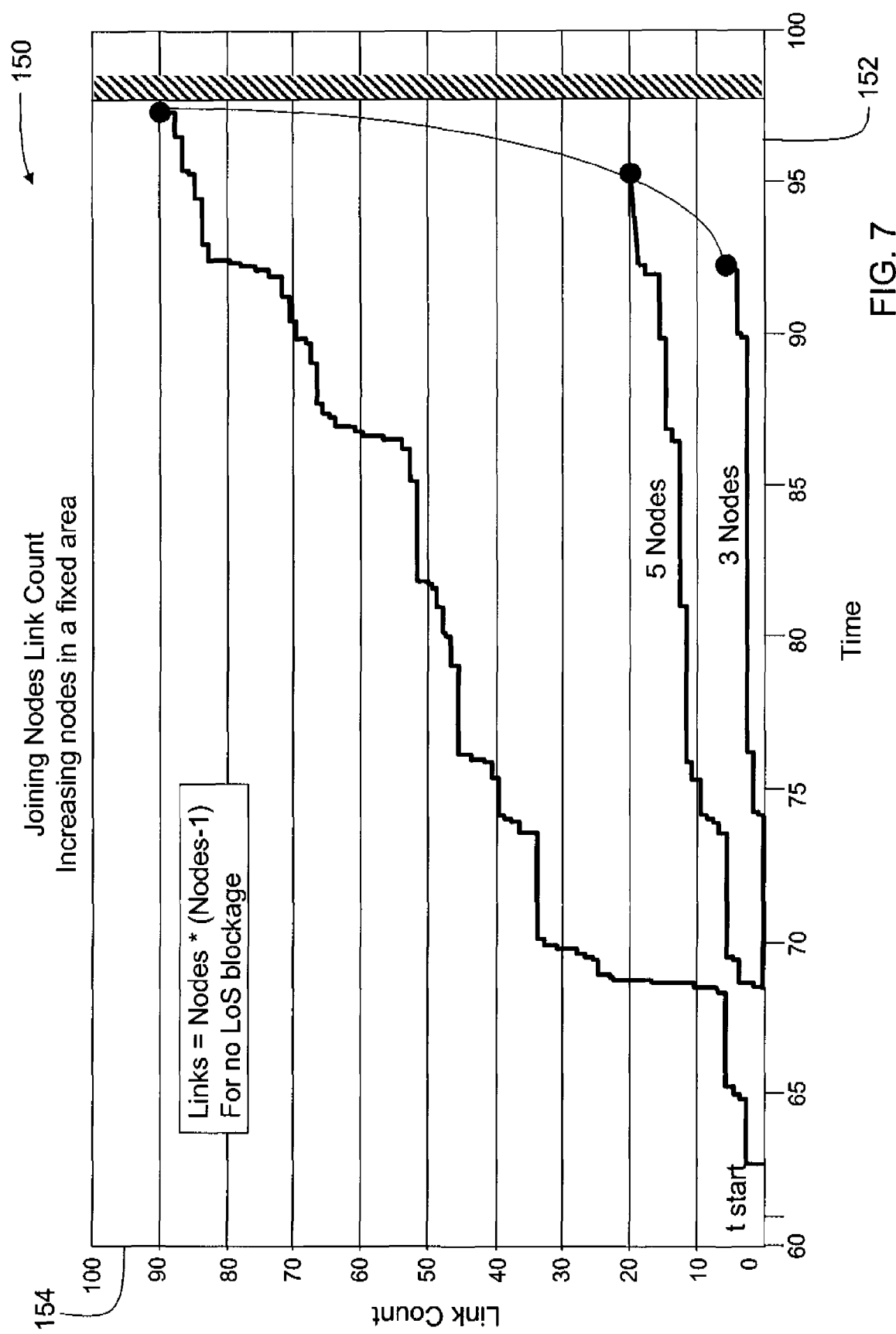
FIG. 7 is a graph illustrating network joining time results for three different mobile terminal network joining scenarios.

FIG. 7 is a graph 150 illustrating joining time results for three scenarios containing different numbers of like mobile terminals or nodes that contain four phased array antennas each describing a $2\pi$ steradian (hemispherical) field of regard. The abscissa 152 represents the simulation time at which each link is discovered and the ordinate 154 presents the accumulative links for each scenario. The nautical mile range increments used for these analyses were 2, 4, 8, 16, 32, 34, 128, and 256 nautical miles. Network joining began with OSPFv2 sending a network joining packet from each node at 60 seconds. There are two five millisecond control slots in each 100 millisecond frame time. Therefore, each node (mobile terminal) can transmit network joining packets within that five millisecond control slot, every 100 milliseconds. OSPFv2 (RFC 2328) produces five different packet protocol types of which the network joining packet is only one. The link layer interrogates the packet header, identifies it as a network joining packet and then commences the joining process as above described.

The rationale used for depending on the routing protocol to initiate joining instead of adding a joining state to the link layer was to integrate better with the OSI reference model and standards and not to create any new packet protocols. Although completing the joining process takes 46.5 seconds (out to 256 nautical miles), all node-node links are discovered in less than 38 seconds. That is due to the close proximity of the nodes. Using the conventional method of limiting one packet or link to a given control slot, the time necessary to complete the joining process would be 85.6 seconds, an 84% increase in time over the 46.5 second joining process using the methods and system described herein. If the control slots of a frame time have a longer duration, the joining time will decrease linearly.

The above described methods and systems address the disadvantages or limitations of prior solutions that utilize omni-directional antennas for transmission of the network joining packets. Use of the omni-directional antenna for transmission is a limitation as more power is required for transmitting over a given range than narrow beam transmissions. Additionally, over long ranges network joining packet transmission with omni-directional antennas will likely interfere with other mobile terminals that are closer in range.

Known TDMA, Layer 1, and Layer 2 implementations employ a small fraction, for example, five to ten percent of the total available TDMA slots for network communication and management. As described herein those assigned slots are referred to as control slots. The majority of the TDMA slots are used to communicate application information once joined. However, transmitting multiple network joining (or hello) packets within a single control slot of a TDMA time frame greatly reduces the time involved to perform terminal discovery over known methods.

While the invention has been described in terms of various specific embodiments, those skilled in the art will recognize that the invention can be practiced with modification within the spirit and scope of the claims.

What is claimed is:

1. A method for transmitting network joining message packets from a network device during control slots of a time division multiple access (TDMA) frame sequence, said method comprising:
   determining a size of the network joining packet to be processed for transmission;
   recognizing which slots of the TDMA frame sequence are control slots;
   subdividing the control slots based on at least one of the size of the network joining packet and a data rate of a control slot queue;
   associating a line of sight azimuth, an elevation, and a range with a first network joining message packet;
   incrementing at least one of the line of sight azimuth, the elevation, and the transmission range for association with each subsequent network joining message packet; and
   transmitting, from the network device, a number of the network joining message packets during the control slot of the TDMA frame sequence, the number of network joining message packets transmitted based on the subdivision of the control slots.

2. A method according to claim 1 further comprising interrogating a header of a received message packet to determine if the packet is a network joining message packet.

3. A method according to claim 1 wherein recognizing which slots of the TDMA frame sequence are control slots comprises:
   randomly determining if the network joining message packets are to be transmitting during a first control slot or a second control slot of a TDMA frame sequence; and
   designating the remaining control slot for reception of network joining message packets from other transmitting nodes.

4. A method according to claim 1 wherein associating a line of sight azimuth, an elevation, and a range with a first network joining message packet comprises setting a lowest possible line of sight azimuth, elevation, and transmission range for a first network joining message packet transmission.

5. A method according to claim 1 wherein transmitting a number of the network joining packets further comprises:

a) setting a lowest possible line of sight azimuth, elevation, and transmission range for a first network joining message packet transmission;
b) incrementing the line of sight azimuth by one 3 dB antenna beam width for subsequent network joining message packet transmissions until an extent for the line of sight azimuth is reached;
c) resetting the line of sight azimuth to the lowest possible value;
d) incrementing the elevation by one 3 dB antenna beam width for subsequent network joining message packet transmissions;
e) repeating steps b) through e), until an extent for the elevation is reached;
f) resetting the line of sight azimuth and elevation to the lowest possible value;
g) incrementing the transmission range for subsequent network joining message packet transmissions;
h) repeating steps b) through g) until a maximum line of sight azimuth, a maximum elevation, and a maximum transmission range is reached; and
j) initiating routing protocol network communications in TDMA non-control data slots if a network response message has been received.

6. A method according to claim 3 further comprising defocusing a beam of a phased array antenna beam to emulate an omni-directional antenna for the field of regard of the phased array antenna.

7. A method according to claim 1
wherein incrementing at least one of the line of sight azimuth, the elevation, and the transmission range for association with each subsequent network joining message packet comprises incrementing at least one of line of sight azimuth and elevation by one-half a 3 dB beam width for a subsequent network joining message packet transmission.

8. A method according to claim 1 wherein transmitting a number of the network joining message packets during the control slot of the TDMA frame sequence comprises transmitting the network joining message packets using a beam from a phased array antenna.

9. A method according to claim 1 wherein subdividing the control slots comprises:
   calculating a message packet transmit time as the size of the message packet divided by a transmission data rate; and
   calculating a message flight time as a transmission range divided by the speed of light.

10. A method according to claim 9 further comprising pointing a beam of a phased array antenna at an assigned azimuth and elevation for a duration of the combination of the packet transmit time and the message flight time.

11. A method according to claim 1 wherein transmitting a number of the network joining message packets during the control slot of the TDMA frame sequence comprises transmitting network joining message packets until a guard time associated with the control slot occurs.

12. A method according to claim 1 wherein said method is initiated utilizing a standard routing protocol.

13. A network device comprising:
   a processor programmed with a message routing protocol, a link layer, and a media access (MAC) layer;
   a transmitter configured to receive network joining message packets from said processor; and
   an antenna operable to transmit at least network joining message packets received from said transmitter, said link layer configured to set a line of sight azimuth, elevation, and transmission range for a field of regard for said antenna for a first network joining message packet transmission and increment at least one of line of sight azimuth, elevation, and range for each subsequent network joining message packet transmission, said network device programmed to transmit multiple network joining message packets during a control slot of a time division multiple access (TDMA) frame sequence.

14. A network device according to claim 13 wherein said link layer is configured to determine whether a message received from said message routing protocol is a network joining message packet.

15. A network device according to claim 14 wherein said link layer is configured to randomly determine if the network joining message packet is to be transmitting during a first control slot or a second control slot of a TDMA frame sequence.

16. A network device according to claim 13 wherein said link layer is configured to append control information related to transmission of a network joining message packet to a network joining message packet.

17. A network device according to claim 13 wherein said MAC layer is configured to subdivide the control slot of the TDMA frame sequence based on at least one of the size of the network joining packet and a data rate of a control slot queue to determine a number of network joining message packets that can be transmitted during the control slot.

18. A network device according to claim 13 wherein to set a line of sight azimuth, elevation, and transmission range for a field of regard for said antenna, said link layer is configured to:
set a lowest possible line of sight azimuth, elevation, and transmission range for a field of regard for said antenna for a first network joining message packet transmission.

19. A network device according to claim 13 wherein said antenna comprises a phased array antenna.

20. A network device according to claim 19 wherein said phased array antenna is configured to:
focus at the designated azimuth and elevation during a transmission control slot; and
defocus to emulate an omni-directional antenna for the field of regard extent of said phased array antenna during a receiving control slot.

21. A network device according to claim 13 whereupon transmission of a network joining message packet, said MAC layer is configured to send an interrupt to said link layer to cause said link layer to forward a next network joining message packet to said MAC layer along with its designated azimuth, elevation, and transmit range.

22. A network device according to claim 13 wherein said MAC layer is configured to place a network joining message packet into a next available control slot of a TDMA frame sequence that is configured as a transmit control slot.

23. A network device according to claim 13 wherein said processor is programmed to:
a) set a lowest possible line of sight azimuth, elevation, and transmission range for said transmitter and said antenna to be associated with a first network joining message packet transmission;
b) increment the line of sight azimuth by one 3 dB antenna beam width for subsequent network joining message packet transmissions until an extent for the line of sight azimuth is reached;
c) initiate routing protocol network communications in TDMA non-control data slots if a network response message is received;
d) reset the line of sight azimuth of said antenna to the lowest possible value;
e) incrementing the line of sight elevation by one 3 dB antenna beam width for subsequent network joining message packet transmissions;
f) repeat b) through e), until an extent for line of sight and elevation of said antenna is reached;
g) reset the line of sight azimuth and elevation for said antenna to the lowest possible settings;
h) increment the transmission range of said transmitter for subsequent network joining message packet transmissions;
i) repeat steps b) through h) until a maximum line of sight azimuth and a maximum elevation for said antenna, and a maximum transmission range for said transmitter is reached.

24. A network device according to claim 13 wherein to transmit multiple network joining message packets during a control slot of a time division multiple access (TDMA) frame sequence said link layer is configured to:
calculate a network joining message packet transmit time as the size of the network joining message packet divided by a transmission data rate; and
calculate a message travel time as a transmission range divided by the speed of light; and
cause a transmitting phased array antenna beam to point at an assigned azimuth and elevation for the duration of the combination of the packet transmit time and the message travel time.

25. A network device according to claim 13 wherein to transmit multiple network joining message packets during a control slot of a time division multiple access (TDMA) frame sequence, said link layer is configured to provide network joining message packets to said MAC layer until a guard time associated with the control slot occurs, the guard time fixed at a data communications maximum range for said network device divided by the speed of light.

26. A network device according to claim 25 wherein to calculate the number of network joining message packets that can be transmitted during a control slot, said link layer is configured to:
calculate a message packet transmit time as the size of the message packet divided by a transmission data rate;
calculate a message flight time as a transmission range divided by the speed of light; and
calculate the number of network joining message packets that can be transmitted during a control slot based on a duration of the control slot minus a guard time divided by the sum of packet transmit time and message flight time.

27. A network device according to claim 13 wherein said processor is configured to utilize the message routing protocol to initiate transmission of the network joining message packets.

28. A method for using the duration of a control slot of a time division multiple access (TDMA) frame sequence to transmit multiple network joining message packets from a network device, said method comprising:
determining a size of the network joining message packet to be transmitted by the network device;
calculating the number of network joining message packets that can be transmitted by the network device during a control slot based on the size of the network joining message packet and a transmission data rate associated with the TDMA frame sequence;
associating a specific line of sight azimuth, elevation, and range with each network joining message packet; and transmitting, from the network device, a number of the network joining message packets during the control slot of the TDMA frame sequence, the number of network joining message packets transmitted based on the subdivision of the control slots.

29. A method according to claim 28 wherein calculating the number of network joining message packets that can be transmitted during a control slot comprises:

dividing the size of the network joining message packet by the transmission data rate; and calculating a message packet travel time as a transmission range divided by the speed of light.

30. A method according to claim 29 further comprising calculating a total number of joining packets associated with the control slot such that the last network joining message packet transmitted during a control slot and the associated message travel time for the last message occur within the control slot time of the TDMA frame sequence minus a guard time for the control slot.

31. A method according to claim 28 further comprising randomly determining if the network joining message packets are to be transmitting during a first control slot or a second control slot of a TDMA frame sequence.

* * * * *

UNITED STATES PATENT AND TRADEMARK OFFICE
CERTIFICATE OF CORRECTION

PATENT NO. : 7,583,641 B2
APPLICATION NO. : 11/419926
DATED : September 1, 2009
INVENTOR(S) : Bruce J. Lord It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Fourteenth Day of September, 2010

David J. Kappos
*Director of the United States Patent and Trademark Office*